March 18, 1975 C. E. BRAUE Re. 28,365

PRESSURE-OPERATED LAYERED ELECTRICAL SWITCH AND SWITCH ARRAY

Original Filed April 30, 1970 2 Sheets-Sheet 1

PRESSURE-OPERATED LAYERED ELECTRICAL SWITCH AND SWITCH ARRAY

Original Filed April 30, 1970 2 Sheets-Sheet 2

United States Patent

Re. 28,365
Reissued Mar. 18, 1975

28,365

PRESSURE-OPERATED LAYERED ELECTRICAL SWITCH AND SWITCH ARRAY

Charles E. Braue, Bronx, N.Y., assignor to Data Appliance Corporation

Original No. 3,617,666, dated Nov. 2, 1971, Ser. No. 33,367, Apr. 30, 1970. Application for reissue June 27, 1973, Ser. No. 374,091

Int. Cl. H01h *43/08*

U.S. Cl. 200—86 29 Claims

Matter enclosed in heavy brackets [ ] appears in the original patent but forms no part of this reissue specification; matter printed in italics indicates the additions made by reissue.

ABSTRACT OF THE DISCLOSURE

A pressure-operated electrical switch unit having a layered construction including a substantially planar surface to which pressure is applied to close the switch. The removal of the pressure opens the switch. The switch includes a layer having at least one elongated opening in it which permits portions of the layer to be deflected into an opening in an adjacent layer to move one electrically conductive layer to complete the electrical circuit. An array of the switches may be used for supplying signals created by the pressure of a writing instrument.

BACKGROUND OF THE INVENTION

Electrical switches which are actuated by exerting pressure against their surfaces to complete a circuit and which open the circuit when pressure is removed have been used for various applications including mat switches to operate door-opening devices. Other prior disclosures include pressure-sensitive switches arranged in grids and intended to be used with embossed card readers and handwriting-recording devices; for example, the device shown in U.S. Pat. No. 3,308,253 issued to International Business Machines Corporation on Mar. 7, 1967. The switch disclosed in this patent functions through a elastomer diaphragm which is deformed by the application of a force to thereby move a conductive material which is secured to the underside of the diaphragm into contact with a second conductive material. Upon removing the force, the elastomer diaphragm restores itself to its original position.

Switches of this design have the disadvantage of being over sensitive to a force applied over a larger area since elastomer materials are readily deformed. When a plurality of these switches are used in a multiple switch unit for recording handwriting or other marks made using a writing instrument, such as a pen, pencil or stylus, the varying degrees of pressure applied by portions of the hand including, in particular, the knuckle of the little finger, as it rests on and moves over the switches will cause certain of switches to be unintentionally closed. The problem of inadvertent closing of switches has not heretofore been solved. On the other hand, the closing of each switch must easily be done so as not to tire an operator who may be called on to close many switches at one sitting.

A pressure-sensitive switch which will operate reliably for extended periods of time to close upon the application of a selected pressure which is within the range of normal writing instrument pressures and which will not respond to forces below that minimum is not disclosed in the published literature nor available to industry.

SUMMARY OF THE INVENTION

Broadly, the present invention is a switch device operable by the selective application of pressure to an area of the device which causes a sheet having deflectable portions created by an elongated opening in the sheet. The deflection of these portions against a first conductive layer moves that layer against a second layer which is normally spaced from the first layer thus completing an electrical circuit. When the pressure is released, the deflected portions move back to their inactive position allowing the normally spaced-apart layers to move apart and open the circuit.

It is a feature of the device that it is capable of providing signals for recording through the normal use of a pencil or stylus as the pressure-applying means. Preferably a checkoff form or other piece of paper is placed over the switch which paper delineates the areas to which pressure may be applied through use of a writing instrument. When an intentional and sufficient pressure has been applied to an area, the closing of the switch may cause an audible sound to be heard to notify the operator that the switch closed.

It is also a feature that the deflective action of the nonconductive layer cooperates advantageously with conductive layers made of flexible fabric having a conductive oxide coating.

DESCRIPTION OF THE PREFERRED EMBODIMENT

Figure 1:
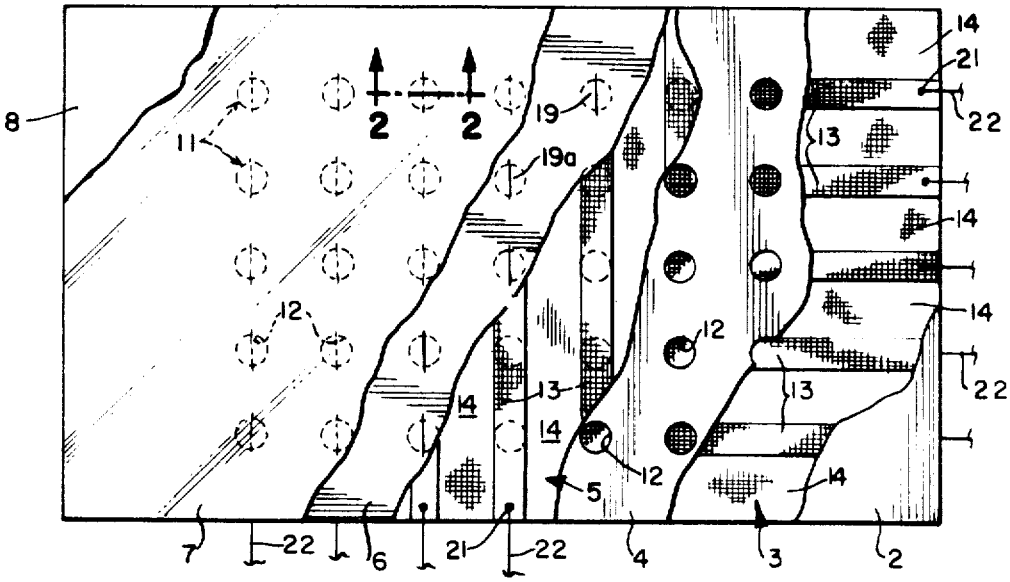
FIG. 1 is a plan view, partially broken away, showing a plurality of switches in a grid arrangement.
Figure 2:
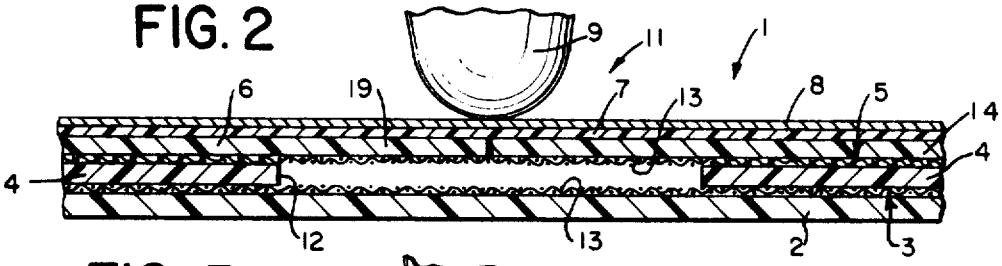
FIG. 2 is a sectional view taken along line 2—2 of FIG. 1 with a pencil point touching but not applying pressure to the surface.
Figure 3:
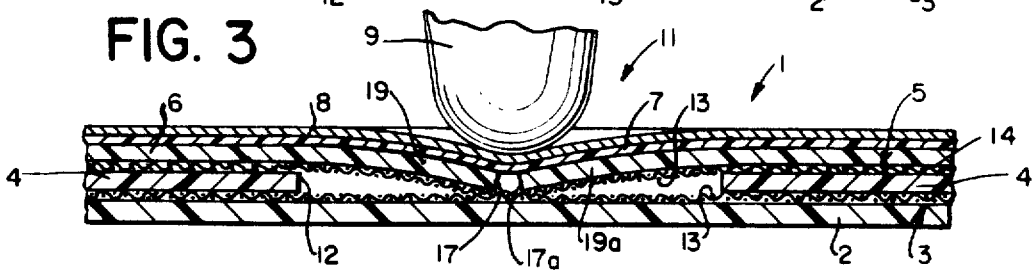
FIG. 3 is a sectional view, similar to FIG. 2, showing the switch having pressure applied to it.

Referring to FIGS. 1, 2 and 3, switch unit 1 is constructed of a plurality of layers including a baseplate 2 made of electrically nonconductive material, such as plastic or paper board, a lower layer of fabric 3, a separator sheet 4, a second layer of fabric 5, an electrically nonconductive substantially noncompressible deflector layer 6 and finally a pressure-transmitting protective sheet 7. These layers may be held together by adhering, clamping or otherwise securing their edges together to provide a seal preventing the water, dirt or bacteria from entering between the layers. The interior surfaces of the layers are not attached to allow the relative movement necessary to the proper functioning of each switch. A sheet of paper 8 including portions indicating where marks should be made is placed on top of the unit and is marked with a pencil point 9 or other writing instrument.

Individual switches 11 are formed by the portions of the layers in and around circular opening 12 of separator sheet 4. Each switch 11 is similarly constructed, with fabric layers 3 and 5 each having, alternatively, an electrically conductive row 13 and a nonconductive row 14.

The conductive rows 13 of layer 3 run perpendicular to rows 13 of layer 5. The fabric may be made in any conventional manner, such as by weaving, matting or knitting. It is required that at least the nonconductive rows of the fabric be manufactured from the nonconductive fibers which may be made of any fiber, natural or synthetic, such as nylon, polyesters or silk. The conductive rows are made by coating those portions with a thin coating of an electrically conductive metal, such as silver or chromium. Alloys of the metals may also be used. A coating which is effectively continuous over the fabric portion having a thickness of about $1\times10^{-6}$ to $40\times10^{-6}$ inches is operable with the thickness of $2\times10^{-6}$ to $6\times10^{-6}$ inches being preferred. The coating is thin enough and adhered to, or absorbed in the fibers to prevent the fibers or significant groups of fibers from becoming attached one to another to reduce the flexibility of the fabric. The coating must also extend over portions of contiguous fibers, including those at the surfaces and in the interior, to assure a complete electrical engagement of fibers throughout the fabric portions. Fibers having denier in the range of 0.5 to 10 are preferred.

The coatings may be applied using the method disclosed in the U.S. Pats. Nos. 2,511,472, 2,867,552, 2,896,570, 2,897,091, 3,014,818, 3,043,796, and 3,862,783. These patents include methods for coating the fibers before the fabric is made and provide a coating that will not wear, crack or flake during use in the switch arrangement herein disclosed.

The entire section of fabric to be used in a switch arrangement may be coated and thereafter the coating in the row areas desired to be nonconductive removed by using a suitable solvent. Alternatively, the strips of fabric may be manufactured having conductive properties and having nonconductive properties and the rows thereafter attached together by sewing adhesives or other suitable means. Preferably the metal coatings used will be resistant to corrosion in the environment herein disclosed.

Fabric layers 3 and 5 have the properties of flexibility and corrosion resistance and, in particular, layer 5 has the ability to repeatedly respond to movement of the deflector layer 6 and to thereafter restore itself to a position in which the layer is in a plane. Layers 3 and 5 may also be made of other materials, such as flexible plastic sheets with portions of conductive material adhered to areas of the sheet to provide rows 13 and 14; however, the material should be able to be repeatedly deflected into openings 12 and thereafter be able to restore itself as the pressure is released.

Figure 4:
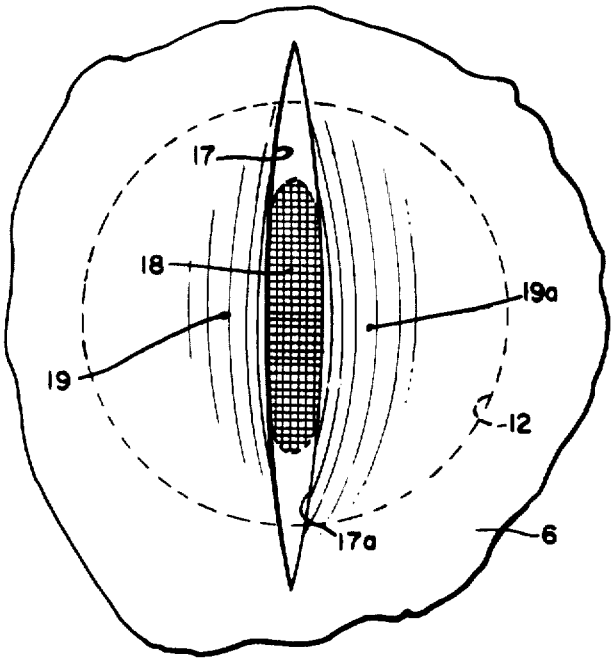
FIG. 4 is an enlarged plan view of the switch and FIG. 5 is a further embodiment showing a three-element switch using three layers of conductive fabric.

Row 13 is positioned to pass over or under an opening 12 so that as pressure is applied to deflection layer 6 portions of the layer 6 deflect into openings 12, as generally shown in FIG. 4, to urge a portion of an upper row 13 against a portion of lower row 13.

Referring in particular to FIGS. 3 and 4, it is seen that the application of pressure by pencil point 9 causes lip portions 19 and 19a located adjacent each opening 12 of layer 6 to be deflected downward in a cantilever action. As portions 19 and 19a move downward edges 17 and 17a of the lips move further apart. The action of the slit adjacent lip portions 19 and 19a create a contact area 18 of fabric-to-fabric engagement when the pencil point 9 is urged downward. Each lip 19 and 19a assumes a generally semicircular shape as it bends downward. When the pressure is removed the lips move back into the plane of the remainder of layer 6. Where the application of pressure by the pencil point is not in the central area of opening 12 the configurations of movement of the lips and size and shape of area 18 will both vary; however, application of sufficient pressure applied anywhere within the circumference of circular opening 12 will cause two areas of rows 13 to engage to close the switch. Even when pressure is not equally applied to each lip, the ability of each lip to move independently permits a fabric-to-fabric engagement.

The cantilever action of lip portions 19 and 19a also assists in preventing a permanent set or dimple being placed in protective sheet 7. The force of the pencil point deflects sheet 7 into an arcuate shape (FIG. 3) as lips 19 and 19a move in the manner herein described thus reducing the pressure on sheet 7 and preventing dimpling of the sheet.

Protective sheet 7 is preferably made of Mylar brand polyester film, sold by E. I. du Pont de Nemours Company. Other types of material may be used if they are sufficiently resilient to resist the formation of dimples in the surface. Separator layer 4 and nonconductive deflection layer 6 may also be made of Mylar or other material. With respect to separator layer 4 it is necessary that the material be sufficiently incompressible to prevent lips 19 and 19a from compressing the portion of layer 4 near opening 12 and interfering with the bending action of deflection lips 19 and 19a. Deflection in the manner shown in FIGS. 2 and 3 without substantial deformation layer 4 is required so that normal pencil point pressure will close the switch while a lesser pressure will not activate the switch. Rows 13 are connected through terminals 21 of leads 22 to connect the electrical circuits with switches 11. Any suitable arrangement of switches can be used.

Figure 3A:
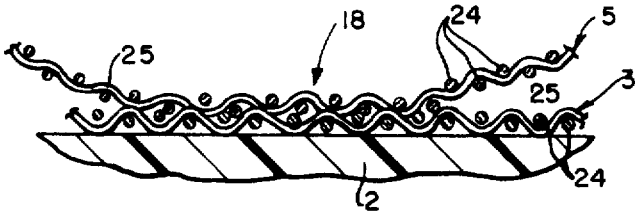
FIG. 3a is an enlarged partial view of FIG. 2 showing conductive fabric layers moved into engagement.

Turning to FIG. 3a, the engagement of two portions of row 13 conductive fabric is shown in which the interwoven sets of fibers 24 and 25 are shown in engagement at a plurality of points. The conductive fabric provides a plurality of electrical contacts to assure the completion of the electrical circuit when the deflection layer 6 is operated to move the upper fabric 5 down into engagement with layer fabric 3.

Figure 5:
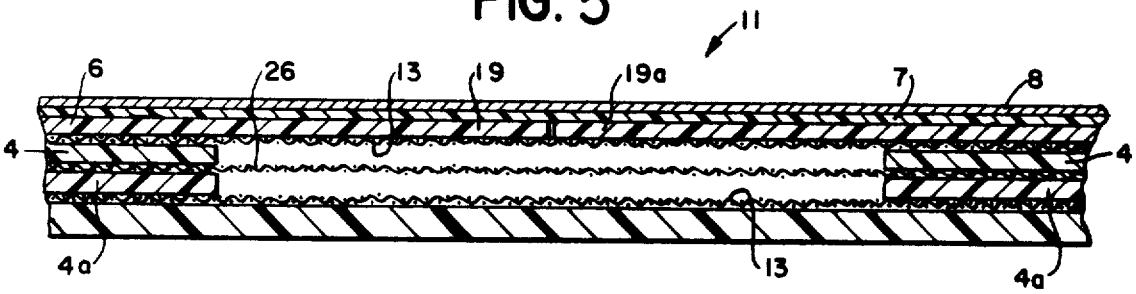
Figure 6:
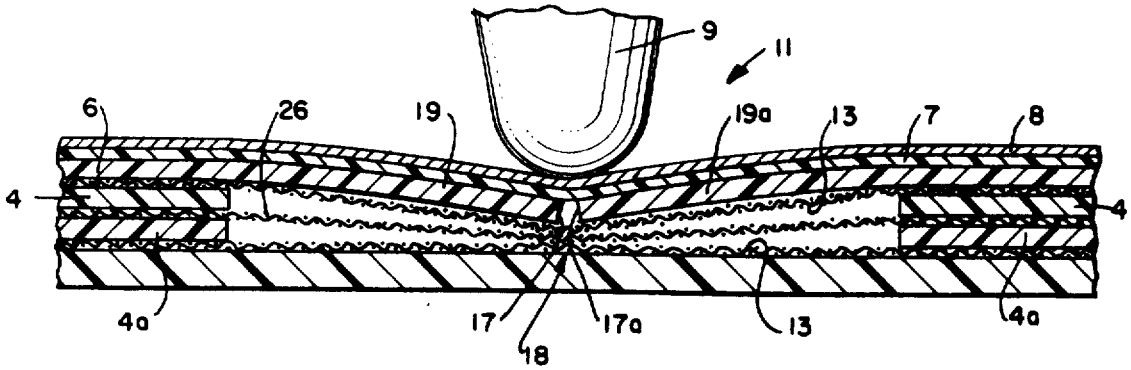
FIG. 6 is an enlarged partial view of FIG. 5 showing conductive fabric layers moved into engagement.

An alternative embodiment of the invention is shown in FIGS. 5 and 6 having three layers of conductive fabric including the additional intermediate layer 26 and additional separator layer 4a. As shown in FIG. 6, deflection lips 19 and 19a operate in the same manner as the switch described above except that after initial engagement of the upper fabric and intermediate fabric they continue their movement downward into engagement with the lower fabric layer to complete a three-element switch.

The switch of this invention is also useful in responding to pressure applied by liquid pressure, for example, the depth of a liquid could be sensed by the pressure required to close the switch.

An array of switches may be used to record the information on a checkoff sheet where an audible signal tells the operator that each check mark has been effective to close a switch and in which scanning of all switch points to register the closed switches can be accomplished by using the electronic keyboard art techniques.

I claim:

1. An electrical switch which is closed by the application of pressure against an area of the switch and is opened when the pressure is removed comprising a. an electrically nonconductive base;

b. a first electrically conductive layer positioned against such base;

c. a nonconductive separator means placed against the side of the conductive layer opposite the base, said separator means having an opening therein;

d. a second electrically conductive layer placed against the side of the separator means opposite the first conductive layer;

e. a layer of nonconductive noncompressible material placed against the side of the second electrically conductive layer opposite the nonconductive layer means, said noncompressible layer having an elongated opening positioned adjacent the opening in the separator means; and f. a pressure-responsive deflectable portion of the noncompressible layer positioned adjacent the opening capable of being deflected down into said opening whereby the application of pressure transmitted to and against the pressure-responsive deflectable portion causes said portion to move a portion of the second conductive layer against the first conductive layer to close the switch.

2. The switch of claim 1 in which the conductive layers are fabrics having electrically conductive material coated thereon.

3. The switch of claim 1 in which the pressure-responsive deflectable portion of the noncompressible layer includes a plurality of lip means adjacent an elongated opening in said noncompressible layer which lip means are capable of being deflected down into said opening in the separator means.

4. The switch of claim 1 having a sheet positioned in engagement with the noncompressible layers for receiving applied pressure which is in turn transmitted to said noncompressible layer.

5. An array of pressure-operated electrical switches arranged in a unit comprising a. an electrically nonconductive baseplate forming the base of the switches, b. a fabric layer positioned on the baseplate and having electrically conductive portions, c. a nonconductive separator layer placed against the side of the fabric opposite the plate, said separator having a plurality of openings therein, d. a second fabric layer having electrically conductive portions and electrically nonconductive portions positioned on the separator layer, and e. a nonconductive noncompressible deflection sheet placed on the second layer, said sheet having deflectable portions in alignment with said openings in the separator layer to permit the deflectable portions to be deflected against the second layer of fabric, said layer having slits therein.

6. The array of claim 5 in having in addition a protective sheet positioned on the noncompressible deflection sheet on which pressure is directly applied.

7. The array of claim 5 in which layers having conductive and nonconductive portions are nylon fabric in which the conductive portions includes woven fibers coated with silver metal.

8. The switch of claim 1 in which the base and the first electrically conductive layer comprise a nonconductive sheet materail having selected areas of conductive material adhered to the sheet material.

9. The array of claim 5 in which the base and the first electrically conductive layer comprise a nonconductive sheet material having selected areas of conductive materail adhered to the sheet material.

10. The array of claim 5 having positioned thereon a sheet of material having delineated areas which indicate where pressure may be effectively applied.

11. An array of claim 5 capable of responding to the application of pressure of a writing instrument and having positioned thereon a sheet of material having delineated areas indicating where pressure may be effectively applied by such instrument.

12. The array of claim 11 in which the sheet is capable of recording marks made by such instrument.

*13. The switch of claim 1 having positioned thereon a sheet of material having delineated areas which indicate where pressure may be effectively applied.*

*14. The switch of claim 1 capable of responding to the application of pressure of a writing instrument and having positioned thereon a sheet of material having delineated areas indicating where pressure may be effectively applied by such instrument.*

*15. The switch of claim 14 in which the sheet is capable of recording marks made by such instrument.*

*16. An electrical switch which is closed by the application of pressure against an area of the switch and is opened when the pressure is removed comprising:*

*a. electrically nonconductive base means;*

*b. first electrically conductive means on said base;*

*c. nonconductive separator means adjacent said first conductive means on the side of said first conductive means opposite said base, said separator means having an opening therein;*

*d. second electrically conductive means adjacent said separator means on the side of said separator means opposite said first electrically conductive means; and*

*e. nonconductive and substantially noncompressible deflector means adjacent said second electrically conductive means on the side thereof opposite said separator means, said deflector means having an elongated opening positioned adjacent said opening in said separator means, and said deflector means having a pressure responsive deflectable portion aligned with said opening in said separator means for deflection into said opening to bring said first and second electrically conductive means into contact.*

*17. The switch of claim 1 wherein at least one of said first and second electrically conductive means includes areas of conductive material on a nonconductive sheet.*

*18. The switch of claim 16 in which the pressure-responsive deflectable portion of the noncompressible layer includes a plurality of lip means adjacent said elongated opening in said noncompressible layer, which lip means are capable of being deflected down into said opening in the separator means.*

*19. The switch of claim 16 having a sheet positioned in engagement with the noncompressible layers for receiving applied pressure which is in turn transmitted to said noncompressible layer.*

*20. The switch of claim 16 having positioned thereon a sheet of material having delineated areas which indicate where pressure may be effectively applied.*

*21. The switch of claim 16 capable of responding to the application of pressure of a writing instrument and having positioned thereon a sheet of material having delineated areas indicating where pressure may be effectively applied by such instrument.*

*22. The switch of claim 21 in which the sheet is capable of recording marks made by such instrument.*

*23. An array of pressure operated electrical switches arranged in a unit comprising:*

*a. electrically nonconductive base means forming a base for the switches;*

*b. first electrically conductive means on said base;*

*c. nonconductive separator means adjacent said first electrically conductive means on the side thereof opposite said base, said separator having a plurality of openings therein in alignnment with portions of said first conductor means;*

*d. second electrically conductive means adjacent said separator means, portions of said second electrically conductive means being in alignment with said openings in said separator means; and*

*e. nonconductive and substantially noncompressible deflection means adjacent said second electrically conductive means, said deflection means having deflectable portions in alignment with said openings in said separator means to permit the deflectable portions to be selectively deflected toward said base means to bring portions of said first and second electrically conductive means into contact, said deflectable portions having slits therein.*

*24. The switch of claim 23 wherein at least one of said first and second electrically conductive means includes areas of conductive material on a nonconductive sheet.*

*25. The array of claim 23 including protective means positioned adjacent said deflection means on which pressure is applied.*

*26. The array of claim 23 wherein said deflectable portions include a plurality of lip means adjacent said slits, said lips being capable of deflection into said aligned openings in said separator means.*

*27. The array of claim 23 having positioned thereon a sheet of material having delineated areas which indicate where pressure may be effectively applied.*

*28. An array of claim 23 capable of responding to the application of pressure of a writing instrument and having positioned thereon a sheet of material having delineated areas indicating where pressure may be effectively applied by such instrument.*

*29. The array of claim 28 in which the sheet is capable of recording marks made by such instrument.*

References Cited

The following references, cited by the Examiner, are of record in the patented file of this patent or the original patent.

UNITED STATES PATENTS

| | | | |
|---|---|---|---|
| 3,056,005 | 9/1962 | Larson | 200—86 R |
| 3,308,253 | 3/1967 | Krakinowski | 200—86 R |

OTHER REFERENCES

Brook et al.: "Programming Elastic Diaphram Switching Matrix by Small Balls," IBM Tech. Disc. Bull., vol. 10, No. 11, April 1968.

DAVID SMITH, JR., Primary Examiner

U.S. Cl. X.R.

200—46, 159 B; 235—61.1